United States Patent [19]

Staniek

[11] 3,944,499

[45] Mar. 16, 1976

[54] NON-AQUEOUS CLEANING COMPOSITION

[76] Inventor: Sabina Barbara Kopycinska Staniek, 304 Pitney Place, Convent Station, N.J. 07961

[22] Filed: July 11, 1973

[21] Appl. No.: 378,067

[52] U.S. Cl. .................... 252/167; 134/2; 252/139; 252/164; 252/170; 252/DIG. 8; 252/DIG. 10
[51] Int. Cl.² .......................................... C09D 9/02
[58] Field of Search ........... 252/166, 167, 163, 164, 252/168, 170, 111, 112, 125, 126, 131, 119, 120, 123, 140, 154, 139, DIG. 10, DIG. 8; 134/2, 7; 106/90; 51/306, 307; 166/193

[56] References Cited
UNITED STATES PATENTS

| | | | |
|---|---|---|---|
| 784,474 | 3/1905 | Corti | 252/123 |
| 1,533,326 | 4/1925 | Marshall | 134/4 |
| 2,890,169 | 6/1959 | Prokop | 252/8.5 P |

OTHER PUBLICATIONS

The Chemical Formulary, Vol. III; Editor, Bennett, p. 285.

*Primary Examiner*—Samuel W. Engle
*Assistant Examiner*—Ralph Palo
*Attorney, Agent, or Firm*—Laurence, Stokes & Neilan

[57] ABSTRACT

A non-aqueous cleaning composition consisting of volatile oil, alcohol and portland cement.

2 Claims, No Drawings

NON-AQUEOUS CLEANING COMPOSITION

This invention relates to an improved non-aqueous cleaning composition for hard surfaces, such as glass and enamel surfaces.

More particularly, this invention relates to an inexpensive composition for cleaning windows which does not require a great deal of effort to remove the dirt or grease which accumulates thereon.

Prior art compositions such as disclosed in U.S. Pat. No. 1,586,008 utilize powdered pumice stone, polish, alcohol and water. Too vigorous polishing with this composition may scratch the surface of the glass because of the nature of the pumice stone.

U.S. Pat. No. 1,986,243 discloses an emulsified cleaning and polishing composition for painted, enameled, varnished and lacquered surfaces, and the like which combines several different ingredients with water and the abrasive snow floss. Such a composition is expensive and not suitable for window cleaning since a fine film of cleaning material drys on the surface and requires additional effort to remove.

It is an object of this invention to provide a non-aqueous cleaning composition for hard surfaces such as glass and enamel surfaces which does not scratch the surface.

It is a further object of this invention to provide a cleaning composition for windows which is inexpensive, easy to prepare and requires less rubbing to clean.

It is a yet still further object of this invention to provide a window cleaning composition which does not leave a filmy residue.

Other objects, features and advantages of the present invention will become apparent to one skilled in the art from the following description of preferred embodiments thereof.

The present invention relates to an improved non-aqueous cleaning composition containing cement as an abrasive in conjunction with an alcohol and a volatile oil.

Preferably, the cement used in this invention is portland cement having a particle size which passes about a 120–200 mesh sieve. The cement having a fine particle size of about 200-mesh is most suitable for use on windows. The coarse powdered cement may be used on the hard enameled surfaces.

Any of the commercial alcohols may be used in preparing the composition of this invention such as methanol, ethanol, propanol and isopropanol.

The volatile oil used in the composition of this invention is preferably kerosene since it is relatively inexpensive and has good degreasing characteristics.

Most preferably, the window cleaning composition of this invention is prepared by mixing about 1 to 5 parts portland cement, 4 to 10 parts kerosene and 4 to 10 parts alcohol, the proportions being by weight. A satisfactory window cleaning composition has been obtained by employing the following proportions of ingredients in parts by weight:

| | |
|---|---|
| Kerosene | 15 parts |
| Isopropanol | 15 parts |
| Portland V Cement | 3 parts |

A similar composition was prepared utilizing 18 parts by weight of methanol in place of the isopropanol and yielded an equally good composition.

In the preparation of the composition of this invention there may be added any well known scenting agent.

The present invention may be embodied in other specific forms without departing from the spirit or essential attributes thereof.

What is claimed is:

1. A non-aqueous cleaning composition consisting essentially of about 1 to 5 parts by weight portland cement having a particle size passing through 120–200 mesh sieve; about 4 to 10 parts by weight of an alcohol selected from the group consisting of methanol, ethanol, propanol and isopropanol, and about 4 to 10 parts by weight of kerosene.

2. The composition of claim 1 consisting essentially of about 15 parts by weight of kerosene, about 15 parts by weight of isopropanol and about 3 parts by weight of portland cement.

* * * * *